No. 787,395. PATENTED APR. 18, 1905.
M. M. PHENICE.
MEANS FOR SEPARATING AND PURIFYING WATER OF CONDENSATION.
APPLICATION FILED JULY 5, 1904.

Inventor
Millroy M. Phenice

Witnesses

By
R. S. & A. B. Lacey, Attorneys

UNITED STATES PATENT OFFICE.

MILLROY MORTON PHENICE, OF COLUMBUS, OHIO.

MEANS FOR SEPARATING AND PURIFYING WATER OF CONDENSATION.

SPECIFICATION forming part of Letters Patent No. 787,395, dated April 18, 1905.

Application filed July 5, 1904. Serial No. 215,287.

*To all whom it may concern:*

Be it known that I, MILLROY MORTON PHENICE, a citizen of the United States, residing at Columbus, in the county of Franklin and State of Ohio, have invented certain new and useful Improvements in Means for Separating and Purifying Water of Condensation, of which the following is a specification.

As is well known, it is objective in the use of steam-automobiles to carry as little water as possible in order to lighten the vehicle to the greatest extent, and to accomplish the above the steam exhausted from the engine is ordinarily condensed and fed back into the boiler for reuse. Before the condensed steam is pumped into the feed-tank it becomes mixed with the oil used in lubricating the engine. This invention aims to separate and purify the water of condensation before same passes back into the boiler.

With the above purpose in view I provide a separator which is used to receive the water of condensation, which is purified by its passage through the said separator and then conveyed to the boiler in its purified condition.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
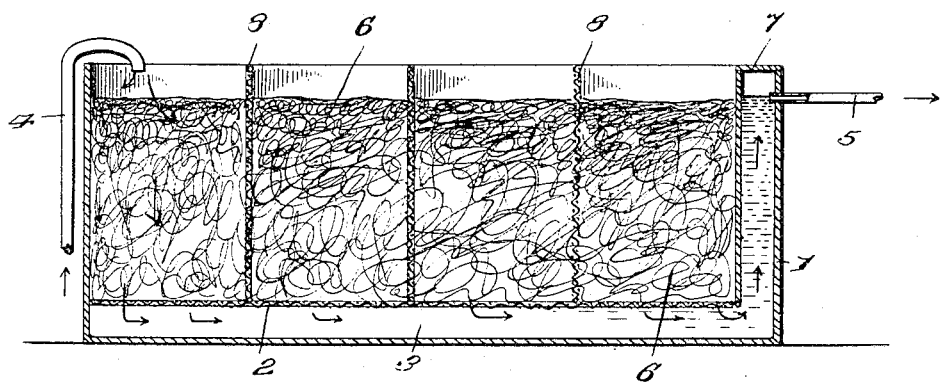
Figure 2:
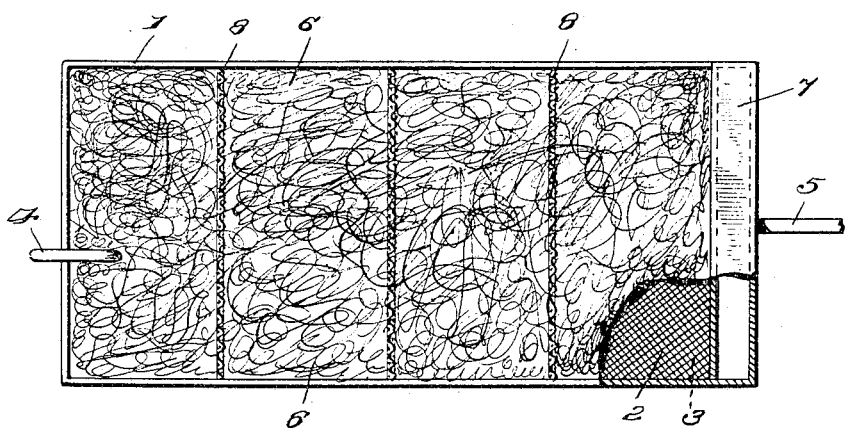

Figure 1 is a vertical longitudinal sectional view. Fig. 2 is a top plan view partially broken away.

Corresponding and like parts are referred to in the following description and indicated in all the views of the drawings by the same reference characters.

The invention comprises a receptacle 1, which may be of any suitable form, though preferably oblong, as illustrated in the drawings, this being, however, non-essential to the gist of the invention. The separator-receptacle 1 is provided with a perforated support 2, disposed within the same and spaced from the bottom of the receptacle to afford a water-passage 3. The perforated support 2 is of screen material preferably and is rigidly supported within the receptacle by any suitable means and in this instance is secured to the sides of the receptacle 1. The support 2 extends almost the entire length of the receptacle, terminating, however, a short distance from the outflow thereof. The inflow-pipe 4 extends into the receptacle 1 at a point above one end, and the other end of the receptacle is provided with an outflow 5, through which the water of condensation passes after having been purified and separated from the oil. Upon the perforated support 2 is disposed a quantity of filtering porous material 6, such as cotton-waste or the like, which material 6 is designed to prevent the oil and water from mixing and separate the oil from the water admitted through the inlet-pipe 4. As the water mixed with the oil passes through the inlet-pipe into the receptacle it will be noted that the oil rising to the surface will remain in the filtering material 6, and the water separated therefrom will pass through said material beneath the support 2 and through the passage 3 out of the opening 5. The support 2 permits the water to percolate or filter because of its structure, at the same time affording a supporting means for holding the porous material 6 in proper position within the receptacle. In order to cause the water which is admitted through the inlet-pipe 4 to pass through the porous material 6 and to afford a clear passage for said water through the opening 5, a solid partition is disposed adjacent the outlet end of the receptacle 1, being spaced a short distance therefrom and extended upward from the end of the support 2. In order to pass through the outlet-opening 5, it will be seen that the water must go beneath the partition 7 and the separation desired will be readily secured.

A plurality of perforated vertical partitions 8 are disposed at intervals in the length of the receptacle 1, said partitions being located upon the support 2. The partitions 8 are very essential, being utilized to prevent slushing or movement of the porous material caused by vibration or jar of the vehicle, which would detract from the efficiency of the invention in a manner clearly apparent.

Any suitable passage or outlet-pipe may extend from the opening 5 to the supply-boiler of the engine, and the water after passage through the said outlets will have been entirely purified and separated, and thus placed in excellent condition for reuse. The opening 5 is approximately upon the same level as the surface of the porous material. The level of the water within the separator is preferably maintained about on a line with the outflow-opening 5, and since the body of the porous material 6 receives the oil and water passing in by the inlet-pipe 4 it will be seen that the oil will not be mixed with the water, due to the shaking of the machine when in motion, the porous material effectually holding the elements from such mixing action. The partitions thus coöperate to prevent slushing of the porous material which would under ordinary conditions enable the oil and water to mix thoroughly. The oil is always maintained above the perforated support 2, due to its specific gravity.

Having thus described the invention, what is claimed as new is—

In a separator, the combination of a receptacle, a solid partition spaced from one end of the receptacle, a perforated support spaced from the bottom of the receptacle and extending from one end thereof to the solid partition adjacent the opposite end above mentioned, the solid partition extending upward from the end of the said perforated support and forming a water-passage at the adjacent end of the receptacle, porous material disposed upon the perforated support between one end and the solid partition at the opposite end, and a plurality of vertical perforated partitions disposed upon the perforated support and in the filtering material.

In testimony whereof I affix my signature in presence of two witnesses.

MILLROY MORTON PHENICE. [L. S.]

Witnesses:
  WM. HEATH,
  CHAS. KLEVER.